United States Patent [19]
Barber et al.

[11] Patent Number: 5,442,779
[45] Date of Patent: Aug. 15, 1995

[54] SYSTEM AND METHOD FOR ENABLING AN INTERPRETED PROGRAMMING LANGUAGE TO BE EXECUTED IN A DATABASE MANAGEMENT SYSTEM ENVIRONMENT

[75] Inventors: Ronald J. Barber, Morgan Hill; Attila J. Fogarasi, Orinda, both of Calif.

[73] Assignee: International Business Machines Corporation, Armonk, N.Y.

[21] Appl. No.: 904,416

[22] Filed: Jun. 25, 1992

[51] Int. Cl.⁶ .......................... G06F 9/00; G06F 17/30
[52] U.S. Cl. ..................... 395/600; 395/700; 395/500; 364/DIG. 1; 364/280; 364/280.4; 364/282.1
[58] Field of Search ............... 395/700, 600, 650, 425, 395/500

[56] References Cited

PUBLICATIONS

Schulman, Andrew, "Linking While the Program is Running-Run-time Dynamic Linking in OS/2," Dr. Dobb's Journal of Software Tools, vol. 14, No. 11, 1989, pp. 46-56.
Allman, Eric, "Interpreters, Prototypes, and Optimization," UNIX Review, vol. 6, No. 7, 1988, pp. 79-83.
Yaghi, H. M., et al., "Introducing REXX Into the Engineering Curriculum, Southeastcon '90 Proceedings," IEEE, 1990, pp. 825-827.
Chi, Shan, et al., "PROFIM: Prolog for Image Management," Proceedings of the 2nd International IEEE Conference on Tools for Artificial Intelligence, IEEE Computer Society Press, 1990, pp. 856-862.

*Primary Examiner*—Paul V. Kulik
*Attorney, Agent, or Firm*—Marilyn Smith Dawkins; Sterne, Kessler, Goldstein & Fox

[57] ABSTRACT

A computer system and method are: provided for interfacing unlike computer software environments of an interpretive programming language (such as Rexx) and a database management system (such as IMS), into a single seamless environment, whereby the facilities of both original environments can be accessed from a single application program, without requiring any awareness of the context of the program. In order to interface the environments, a process and system are provided for mapping data structures of different data types and varying composition into a format that is known and can be utilized by the application program written in the interpretive language.

9 Claims, 8 Drawing Sheets

| 30 → | EMP NAME (82) | EMP 10 (82) | EMP SALERY (82) | EMP MGR ID (82) | DEPT NO (82) |
|---|---|---|---|---|---|
| | SMITH | 2246 | 30500.50 | 3492 | 27 |

85, 86, 87

SYSTEM AND METHOD FOR ENABLING AN INTERPRETED PROGRAMMING LANGUAGE TO BE EXECUTED IN A DATABASE MANAGEMENT SYSTEM ENVIRONMENT

FIELD OF THE INVENTION

This invention relates to interfacing unlike computer software environments into a single seamless environment. More particularly, this invention relates to using an interpretive programming language to retrieve data from a database.

BACKGROUND OF THE INVENTION

A database management system (DBMS) refers to a computer software program which manages a set of files, called a database, and a set of application programs, called transactions. The database files are stored in a data storage device, such as a direct access storage device (DASD), connected to a computer. The files of a database are accessed through names or other identifiable data specified by the user in a prior definition process. In some DBMSs, a database user can update, delete, and retrieve data using an application program that interacts with the DBMS. The application programs are written independent of the specific physical data organization and physical devices. Application programs can be written in a supported common high level programming language. The speed and efficiency by which data can be retrieved from a database depends on how effectively an application programmer is able to use an application programming language.

The IMS database software product from IBM which has been commercially available for many years, is a database manager and a transaction manager. IMS consists of a set of program modules that intercept all requests that an application program makes when accessing data from a database or other terminals. There are two parts to IMS, IMS DB (database) and IMS TM (transaction manager). IMS uses an interface language called DL/I (Data Language/I) for describing the DBMS requests. The IMS database runs on the MVS (Multiple Virtual Storage) operating system.

An application program that runs on the same operating system as IMS, uses the DL/I language to access the database. In IMS, DL/I is used as a data manipulation language that provides a common high-level interface between an application program and IMS. DL/I uses a set of control blocks to define a database's structure. Control blocks are storage areas used by a computer program to hold control information. The two main control blocks used and established by DL/I are the database description (DBD) and the program specification block (PSB). The database is set up and maintained by these and other blocks.

The DBD describes the complete structure of a database, including how the data is physically stored on the storage device and how that data can be accessed. The DBD also specifies the database name, segment names, segment attributes, relationships, field names and access methods. The DBD is specified through the execution of a set of macro invocations which create a predefined description that is stored for use during program execution. The database has a single physical structure as defined by its DBD. Therefore, an enterprise must create one DBD for each IMS database.

The application programs can have more than one logical view of any one database. The views are defined by the PSB (program specification block) which specify which databases a program can access, the data elements within each database that can be accessed, and the processes that the program can do to those elements. Each logical database is defined and the mapping to the physical database is stored in a program communication block (PCB). A PSB is a set of all PCBs for one program. The PSB identifies which pieces of data an application program can access and in what ways that data can be accessed. The predefined PSB is generated using macro invocations and is stored for reference during program execution. The DBD and PSB are combined by an ACBGEN (access control block) provided by IMS and stored together as an ACB for efficiency reasons.

The DL/I control blocks are typically created by an enterprise's database administrator (DBA). The DBA generates the control blocks that are stored in the computer memory or on the storage device. In that way, the DBA defines the database and also controls who has access to each part of the database and the type of access that is allowed, such as whether a user can query the database, or modify data stored in the database.

When processing application programs, the IMS application program communicates witch the DL/I component of IMS through call statements to access the database. Upon receiving a call from the program, the DL/I component references the DBD and PSB control blocks to verify the validity of the request and to obtain descriptive information on the data requested by the program. The DL/I component provides an interface with the program. In IMS, the interpretation of the call from an application program can be qualified by means of qualifier codes or parameters, so that the call parameters are not bound until execution which enables a different type of record to be retrieved by a call statement.

Currently, DBAs and application programmers can access IMS using Cobol, C, Pascal and PL/I (Programming Language/I) which are compiled languages where the entire program has to be fully translated to machine readable form before it can be executed. Whenever a program is modified, it has to be recompiled before the programmer can determine whether the program will run as it was intended. These languages also have other limitations which make programming for a DBMS time consuming and difficult.

An interpretive programming language called Rexx (Restructured Extended Executor) is available from IBM which runs in TSO/E (Time Sharing Option Extension). The TSO/E provides enhancements to the MVS operating system.

Rexx is an easy-to-learn procedural language that allows for structured programming. Rexx is designed to be independent of the operating system on which it runs, but can also make calls to that system. Rexx can run interpretively, where each source language statement of a Rexx computer program is translated to machine readable form and executed before the next statement is translated and executed. The interpretive Rexx language is highly interactive and permits rapid program development. It can also be compiled for faster execution after it has been determined that the program runs as intended without errors.

Rexx is basically a character manipulation language. The Rexx language can be used for developing applications quickly by using instructions which translate easily to functions or routines expressed in other high-level languages. The Rexx language is also easily interfaced to systems utilities for display and for data input and output. Rexx can also be used as a command programming language and as a macro language.

There is no software that provides an interface from Rexx on MVS to a DBMS like IMS. There is also no software for emulating an environment within IMS in order to permit execution of a function not provided by IMS.

The use of an interpretive language such as Rexx in a DBMS environment such as IMS would provide a significant increase in application programmer productivity since the speed of writing and debugging Rexx programs is greater than for any other programming languages that currently exist in the IMS environment.

This is particularly significant since the late binding of DL/I calls and the deferred binding of application logic (until interpretation of the Rexx statements at execution time) can create a synergism to permit context-sensitive application function and allows rapid exploration of database content and stucture.

SUMMARY OF THE INVENTION

A computerized method is provided for retrieving data from a database stored in a data storage device of a data processing system also having a central processing unit (CPU), memory, an operating system and a database management system (DBMS), using an application program written in an interpretive programming language. A data processing environment is initialized for processing the application program by means of the CPU implementing a set of commands. The application program is executed using an interpreter for the application program that is stored in the data processing system memory. Function calls contained within the application program are processed by means of the CPU implementing a set of commands. Function calls include mapping call instructions for mapping constructs of the DBMS to constructs of the programming language, operating system call instructions, DBMS call instructions for extracting data from the database, and requests for functions provided by the invention as extensions to the normal DBMS or application program language environments.

In one form of the invention, the process of initializing the programming language environment comprises designating areas of the data processing system's memory for work area storage during the processing of the application program and initializing data processing system variables for use during the processing of the application program. The processing of the mapping call instructions comprises constructing a mapping data structure stored in the data processing system memory as a key to data types of a plurality of data fields of a DBMS record, specifying a name, a storage location, a length, and a data type for each of the DBMS record fields. The processing of the DBMS call instructions comprises mapping parameters of the programming language to DBMS parameters using a predefined parameter type table, modifying said DBMS parameters by using context-sensitive logic; running the function in the DBMS with the DBMS parameters; and mapping output from the function to the application program format using the parameter type table and context-sensitive logic.

In a preferred form of the invention the DBMS system is IMS, the operating system is MVS, and the interpretive programming language is Rexx.

In another form of the invention a computerized system is provided for retrieving data from a database using an application program written in an interpretive programming language. Means are provided for initializing a data processing environment for processing the application program. Means are provided for executing the application program using an application program interpreter. Means are provided for processing mapping call instructions for mapping constructs of the DBMS to constructs of the programming language. Means are provided for processing operating system call instructions. Means are also provided for processing DBMS call instructions for extracting data from the database.

An objective of the invention is to maximize transparency for a transaction monitor shell for Rexx acting as a pass-through for either IMS or MVS. In doing so, there is a reduction in the release-level dependency on components in Rexx or IMS. The application programming interface provided at the Rexx application program protocol boundary is in the normal Rexx format and the remapping to the API (application program interface) needed at the IMS and MVS protocol boundary is provided which maximizes the Rexx application productivity by providing an intuitive interface. The interface system is open-ended and allows the addition of more services without affecting the form or function of the existing services.

In general, a benefit is provided by enabling application programs for a DBMS such as IMS to be written more easily using an interpretive language such as Rexx where program development requires relatively minimal amounts of time and resources.

DETAILED DESCRIPTION OF THE INVENTION

Figure 1:
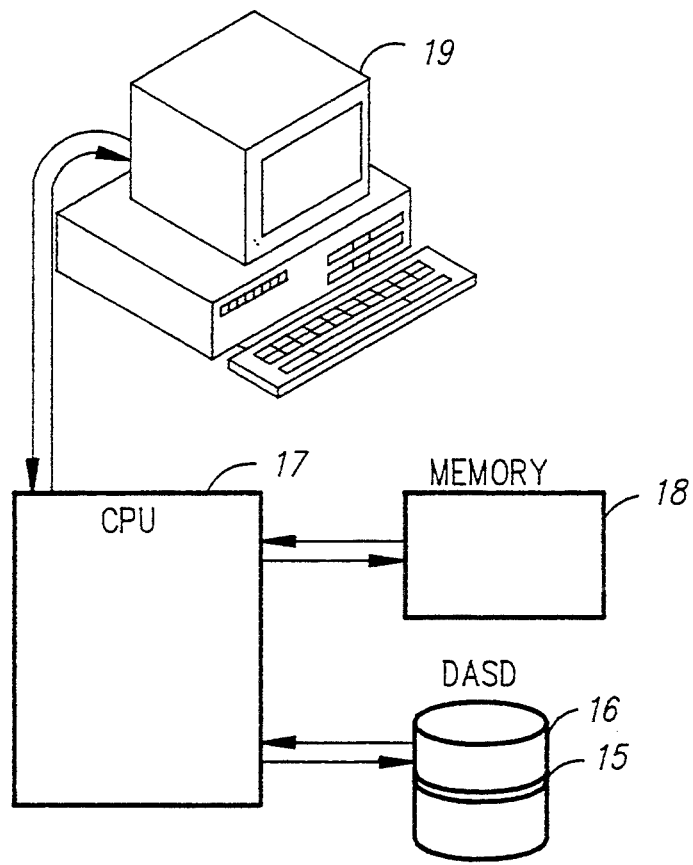
FIG. 1 is a block diagram of the hardware used in the interface system.

Referring to FIG. 1, the data processing system hardware used in the interface system is shown. A set of files organized as one or more databases 15 is stored in a data storage device such as a direct access storage device (DASD) 16. The storage device 16, is connected to a central processing unit (CPU) 17. The CPU is connected to internal memory area 18 and a terminal 19 for interfacing with an application programmer or other database user.

Figure 2:
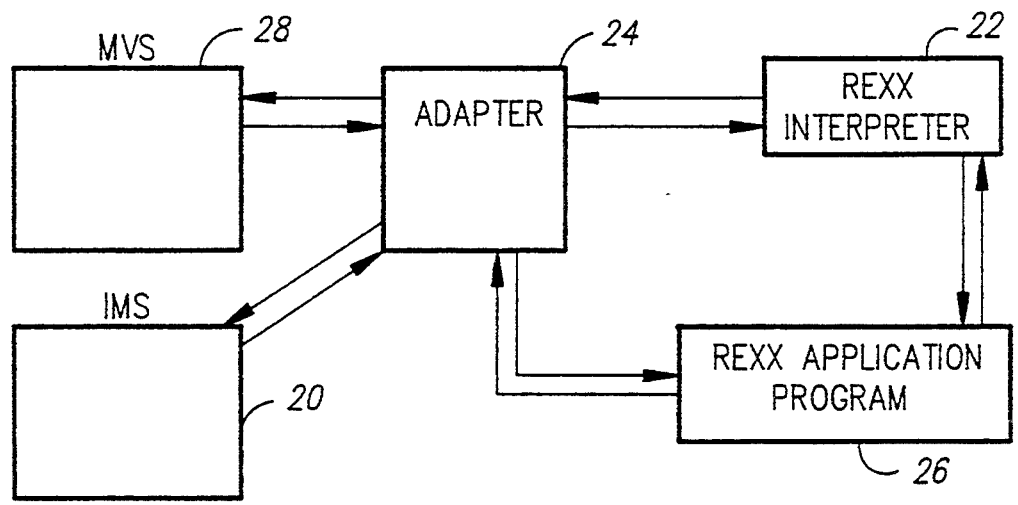
FIG. 2 is an overview of the interface system.

Referring to FIG. 2, an overview of the interface system between an IMS environment 20 and an interpretive Rexx environment 22 shows the flow of control between systems. The IMS database management land transaction management system is a software program that is executed by the CPU in a data processing system such as the one shown in FIG. 1. The IMS program manages transactions on one or more databases 15. When an eligible application program is selected for execution, the initial call is passed to the Adapter interface 24. The Adapter 24 is set of instructions stored in memory 18 that are executed by the CPU 17. The Adapter 24 initializes the environment for the Rexx interpreter 22 to process the Rexx application program 26. The Rexx application 26 can contain IMS calls and Rexx functions. The Rexx functions are processed by the Rexx interpreter 22. The IMS calls are processed through the Adapter 24. The Rexx application can also contain function calls for the operating system MVS 28, which are also processed though the Adapter 24.

In the preferred embodiment of the invention, application programs written in the Rexx programming language are enabled to be executed in an IMS environment. Rexx constructs are mapped to IMS constructs and the Rexx constructs are also mapped to the MVS constructs.

Control blocks are constructed and information is maintained in these blocks essential to the correct processing of the Rexx application program in an IMS environment. The creation and maintenance of these blocks is transparent to the Rexx application program. Additional storage is managed to provide the interface required by MVS, IMS and the Rexx interpreter. All storage used by the interface for control blocks and other data areas is in extended private storage in the same address space as the Rexx application program.

The Adapter 24 handles initialization, execution services, error handling and tracing. The initialization process consists of getting storage, calling Rexx to register the environment, and preparing to execute the application program ("exec"—all application programs in Rexx are called execs). The main service provided by the execution services are the mapping functions. Rexx format variables are mapped to IMS format variables which includes parameter list construction for IMS, and state retention. Database segments are mapped to Rexx variables, using the segment definitions.

Figure 3:
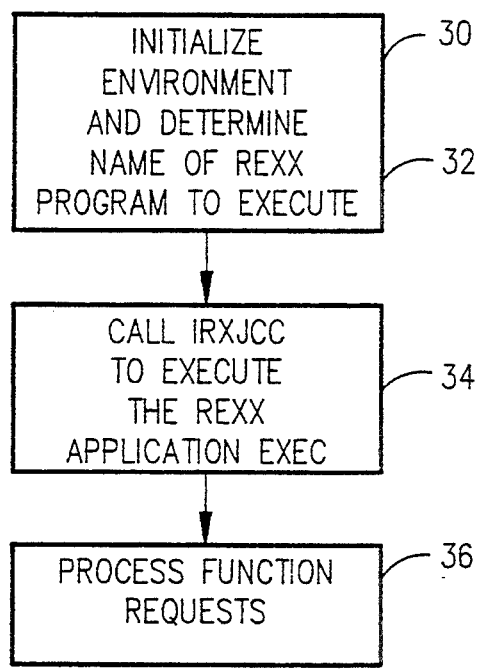
FIG. 3 is a flowchart of the process for processing a Rexx program in conjunction with an IMS database or IMS transaction request.

Referring to FIG. 3, the steps in processing a Rexx program in an IMS environment consist of initializing a Rexx application program processing environment 30 prior to starting the Rexx application program. This includes determining the name of the Rexx application program to execute 32. Next, the Rexx application program is executed using the Rexx interpreter 34. During the execution of the Rexx application program, functions called by the program are executed 36. These function calls include calls to IMS, calls which provide for the mapping of data constructs between IMS and Rexx, and service calls.

Figure 4:
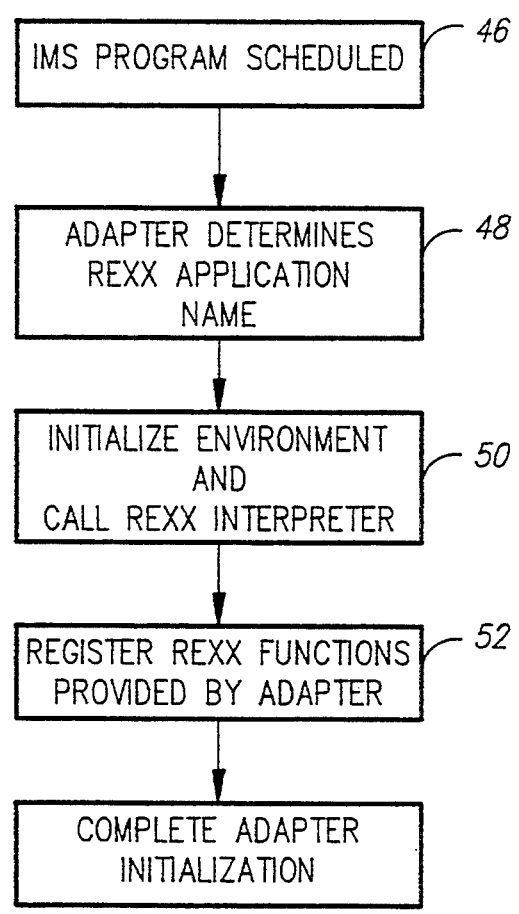
FIG. 4 is a flowchart of the process for initializing the interface system.

Referring to FIG. 4, the initialization process is prompted with the scheduling for execution of the IMS program 46. When a Rexx application is to be executed, the control is given by IMS to the adapter to identify the name of the Rexx application program 48. The name of the Rexx application program, i.e., the name of the Rexx exec to be executed, is derived from the IMS system, and may be modified by an environment-specific exit routine. The Adapter issues a call to IMS to determine the name of the program that the IMS transaction wants to schedule, and uses this name as the first choice of Rexx Exec name. This name can be changed by a user exit that is called by the Adapter to make the final choice of Rexx Exec name.

The environment for processing the Rexx program is initialized 50. As is well known by those skilled in the art, the initialization process consists of getting storage (designating areas of memory) for Work areas used by the Adapter, and setting initial values for system variables internal to the Adapter. The TSO/E Rexx interpreter is called to build the Rexx environment by using the IRXINIT function. A subcommand environment is added, using the IRXSUBCM function of TSO/E Rexx. This enables the Rexx application to access the Adapter as a standard extension of the Rexx programming language. Any Rexx functions specially provided by the adapter are also registered 52.

After the data areas and parameter list required for the Rexx interpreter is completed, the Rexx interpreter is called by passing control to IRXJCL 34. The Rexx interpreter will in turn give control to the Rexx application, and execute it. The Adapter remains available to process function requests from the application program.

Figure 5:
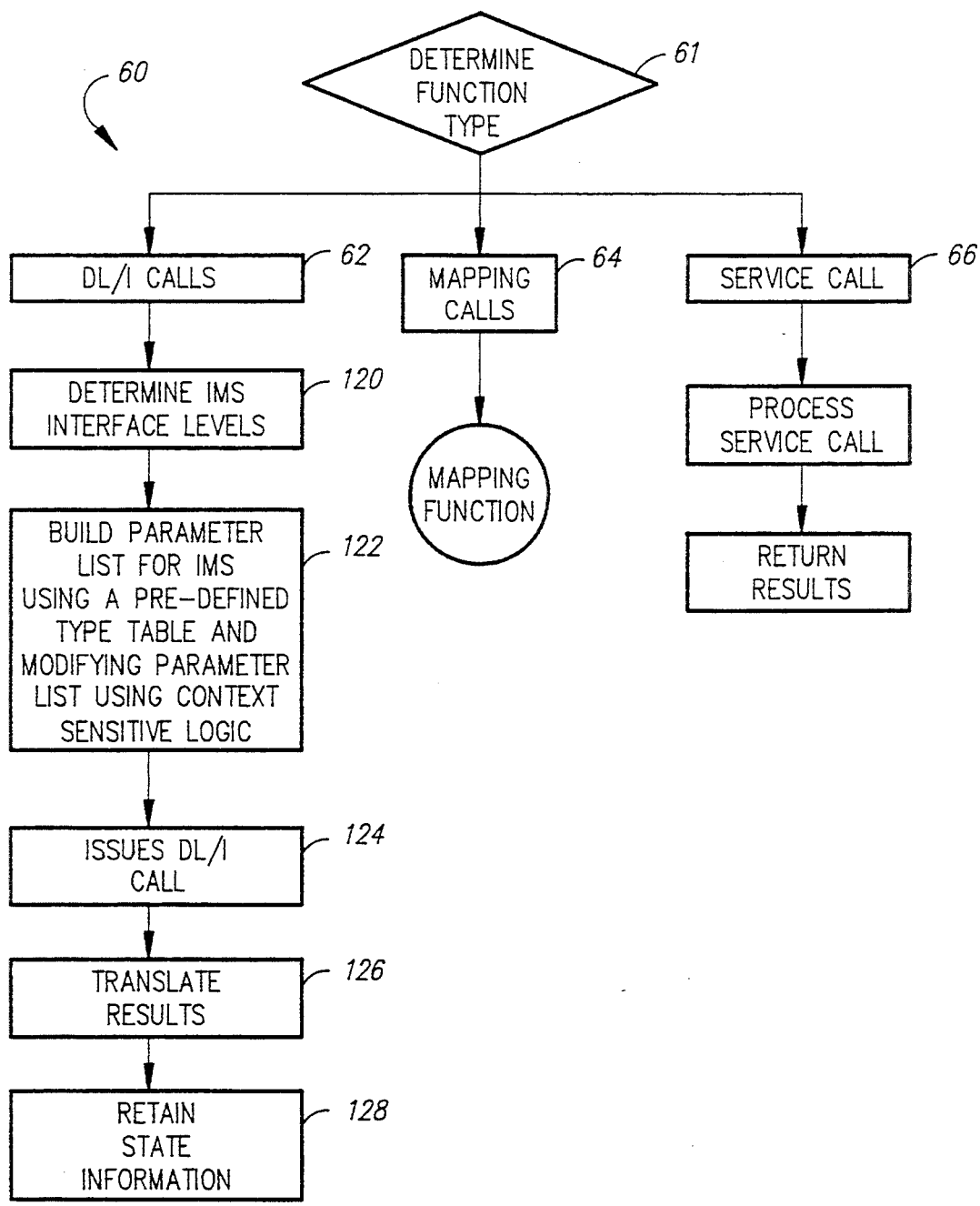
FIG. 5 is a flowchart of the process for processing function calls.

The application program as part of its execution may issue function call requests that are processed by the Adapter. A preferred embodiment for the processing of function calls is shown in 60 in FIG. 5. First, the type of function call is determined 61. The function requests to the Adapter consist of three types: DL/I calls (also referred to as DBMS or interface calls) 62, Mapping calls 64, and Service requests 66.

DL/I calls 62 cannot be processed from the Rexx application since it is impossible in the Rexx programming language to construct the DL/I call parameter list with the right data types, as required by IMS. Rexx is limited to character constructs while a DBMS such as IMS requires various data field types including numerical and address values for a variety of reasons. For example, allowing query operations needing to be performed on these fields such as determining salary ranges or item cost ranges for records to be output. This problem is solved by providing a language extension, as an address environment, to specify the DL/I calls in the Rexx program. The DL/I call request is translated by the Adapter into the required IMS format.

In order to provide compatibility between a Rexx application program and the IMS database for the DL/I calls, the data structures used in IMS must be reconciled. This is accomplished through the Mapping calls 64.

Figure 6:
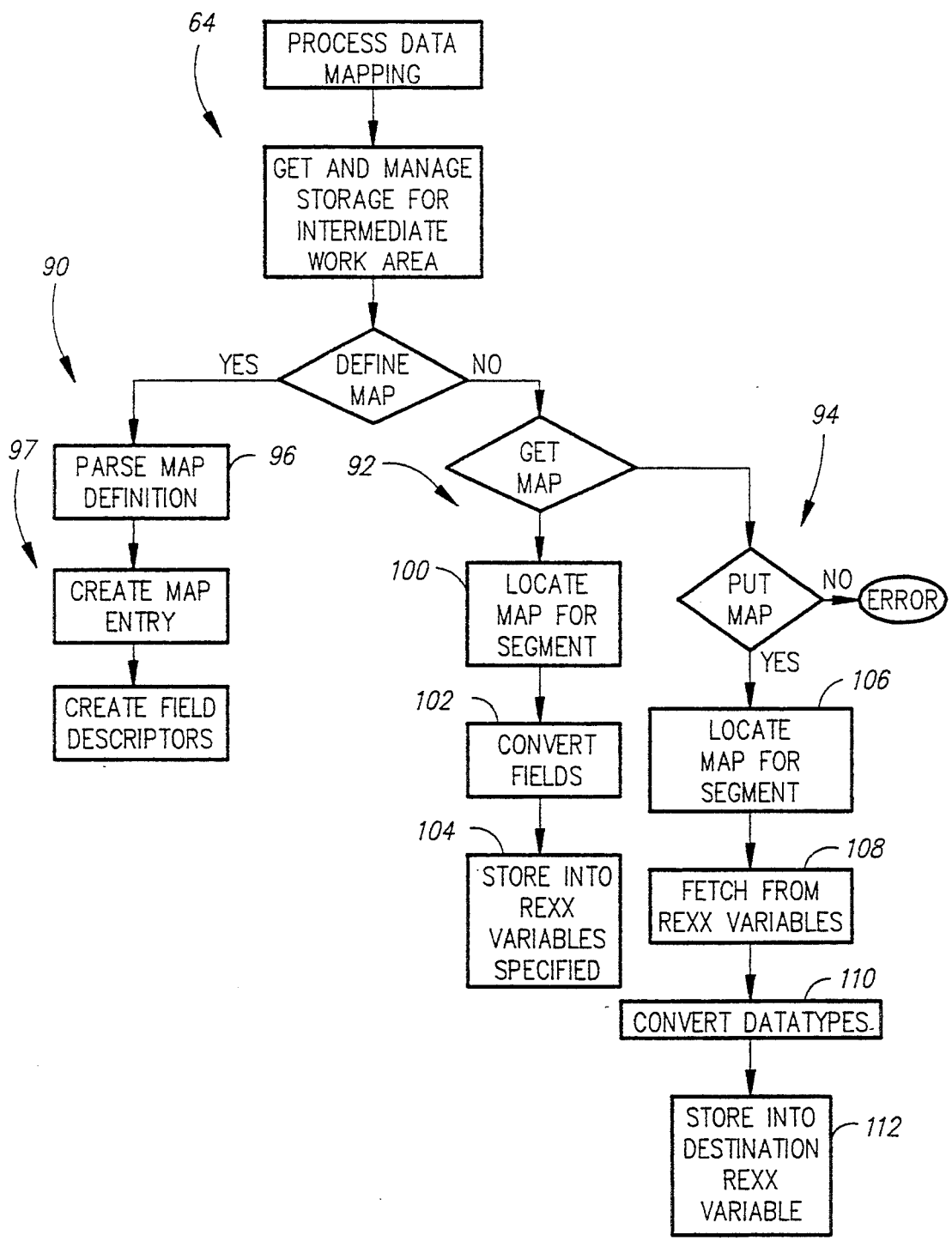
FIG. 6 is a flowchart of the process for mapping data.

The Mapping calls 64 in FIG. 6 are for a data mapping service. This data mapping has the purpose of allowing access to an IMS database record's data contents in a way that is familiar to Rexx application programmers.

Figures 7, 8:
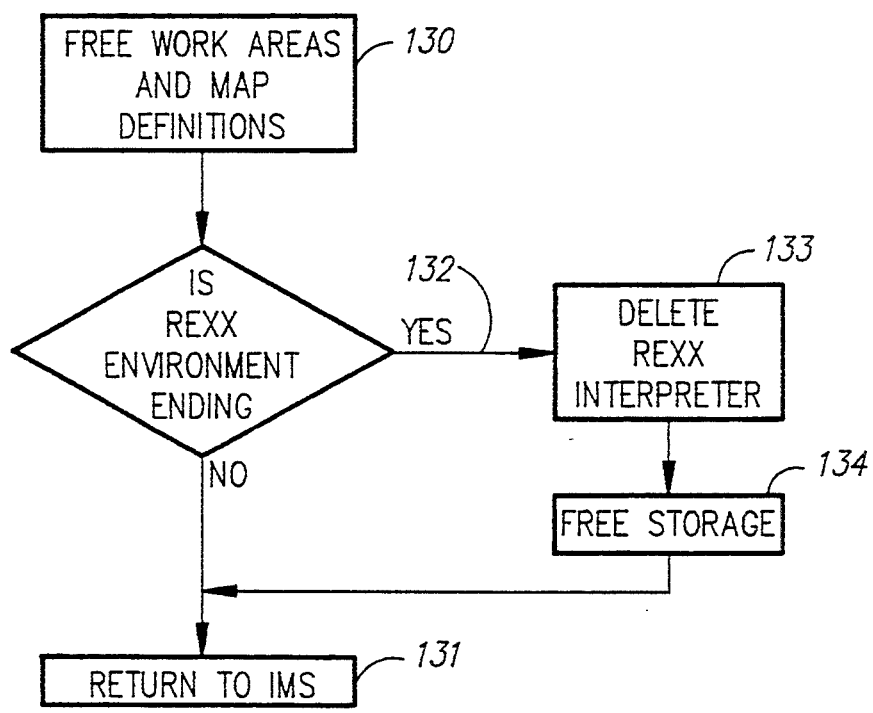
FIG. 7 is a schematic diagram of an IMS record.
FIG. 8 is a flowchart of the process for terminating the interface.

Referring to FIG. 7, an IMS database record 80 consists of a concatenated series of fields 82, of differing data types. For example the EMPloyee NAME field 85 contains characters of a finite predetermined length, while the EMPloyee ID field 86 and the EMPloyee SALARY field 87 contains a fixed length of numeral values. The numeric fields cannot be considered as character fields since operations may need to be performed on these fields during a query operation, such as identifying all employees whose salaries are in a certain salary range.

The mapping function allows the Rexx programmer to define the names, location, length, and data type of fields within the IMS record, and to map the data from Rexx variables to and from the IMS database. The Mapping calls consist of MAPDEF 90, MAP GET 92, and MAPPUT 94.

The MAPDEF call 90 defines the map, establishing its initial conditions. An internal data structure is constructed representing the information provided by the parameters supplied with the MAPDEF call. The map definition that is provided is parsed 96 and the map entry is created including an identifying name and field descriptors 97. The data structure for the map definition is in the form of a linked list of variable length data elements, with each element representing a map name (the implementation of which is well known to those skilled in this field). The elements are variable length as they consist of a fixed length portion followed by an n-tuple representation of the map fields, where n is determined by the number of fields contained in a given map.

The MAPGET call 92 uses a map name, previously defined in a MAPDEF call and stored in the internal representation described above, to transform data from a single stream of characters (such as an IMS database record, encapsulated in a single Rexx variable), into the multiple fields represented by multiple Rexx variables (one for each field). The transformation is governed by the map definition as to data position, length, and data type conversion. During processing of the Mapping call, the applicable map segment is located 100, the IMS fields are converted to the Rexx data type 102 and stored into Rexx variables specified with the call 104.

The MAPPUT call 94 is analogous to the MAPGET call 92, but moves data in the opposite direction. A set of Rexx variables, specified on the call, are used to construct a single data segment using the format specified in the map being used. In processing the MAPPUT call, the map segment is located 106, the Rexx variables to be converted are fetched 108, the data types are converted 110, and stored in the destination Rexx variable 112.

Examples of unusual data transformations that are necessary in order to make the DL/I calls work are the special handling of the ZZ field used by IMS for communication of rarely used information, and the generation of the IMS prefixed length fields where the Rexx standard is separate length fields, an extension of the length field, which occurs in several different formats based on context.

DL/I calls are processed 62 as follows: The values of Rexx variables specified on the DL/I call are extracted 120 and used to build the correct parameter list passed to IMS. This consists of copying the supplied parameters and changing their values to the format required by IMS for that specific DL/I call 122. The programming language (Rexx) parameters are mapped to the DBMS (IMS) parameters using a predefined parameter type table that is contained in the Adapter. The mapping of parameters and the mapping service calls are distinct. The DBMS parameters are also modified based on the context of the DBMS call to provide context-sensitive logic.

Next, a call is issued to DL/I 124. After completion of the DL/I call, the output parameter(s) from the call are copied back into their corresponding Rexx variables 126, including any appropriate data transformations which are well known to those skilled in the art. State information about the call is also retained 128. The Adapter maintains a state machine for DL/I calls, and keeps information on the last call available.

There is also a translation of the DL/I status code in order to indicate the "success" result for all appropriate values. This makes it easier for the Rexx application to check for successful DL/I call completion by being able to check for a single value, rather than for several different values, which are context-sensitive (and liable to change with IMS releases).

DL/I calls from the Rexx application are supported using either an application interface block (AIB) or program communication block (PCB). The parameter list as required by IMS is constructed for the DL/I calls. This is controlled by a table defined within the Adapter, that determines which parameters are used for input, output, or both, and their data types, and is context sensitive. The context-sensitivity is implemented in the Adapter code, and is necessary since some IMS calls require different data types for the same operand based upon the context of the call. In that way the need for the application program to somehow allow for this anomalous behavior of IMS is avoided.

The application program can also make service requests 66 for any additional functions that are provided by the Adapter. These functions can provide the Rexx application program with services that are useful for its execution in an IMS environment, and do so in a way that is compatible with the IMS management of the execution environment. For example, storage is obtained and managed in the same way as IMS manages its applications. A particular value for applications is the ability to get persistent storage that is sharable between transaction instances in the same dependent region.

Referring to FIG. 8, the termination of the processing comprises freeing work areas and map definitions 130 returning to IMS 131. When the Rexx environment is ending 132, the interpreter is deleted 133 and storage is freed 134.

Figure 9:
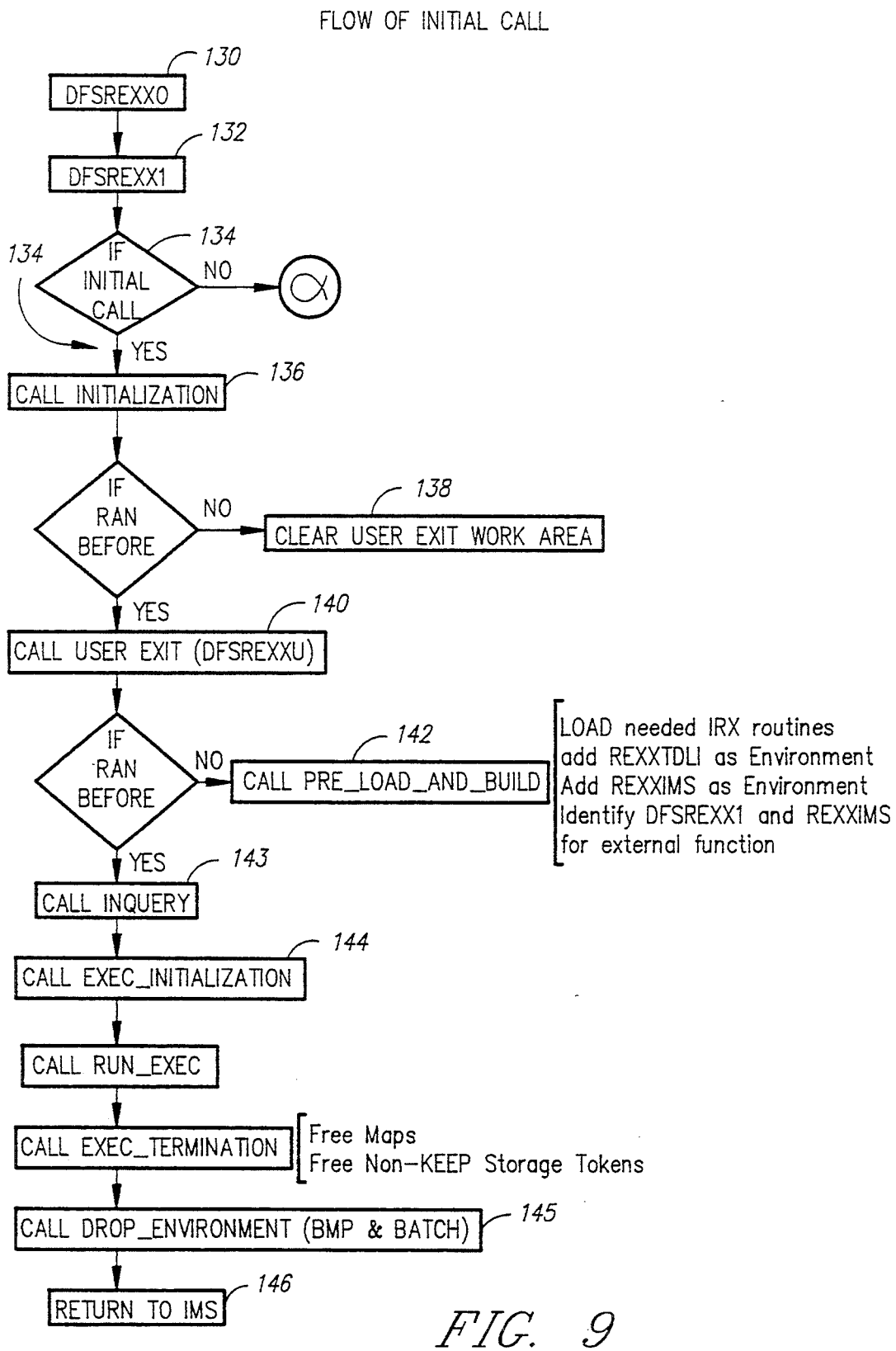
FIG. 9 is a flowchart for initial calls.
Figure 10:
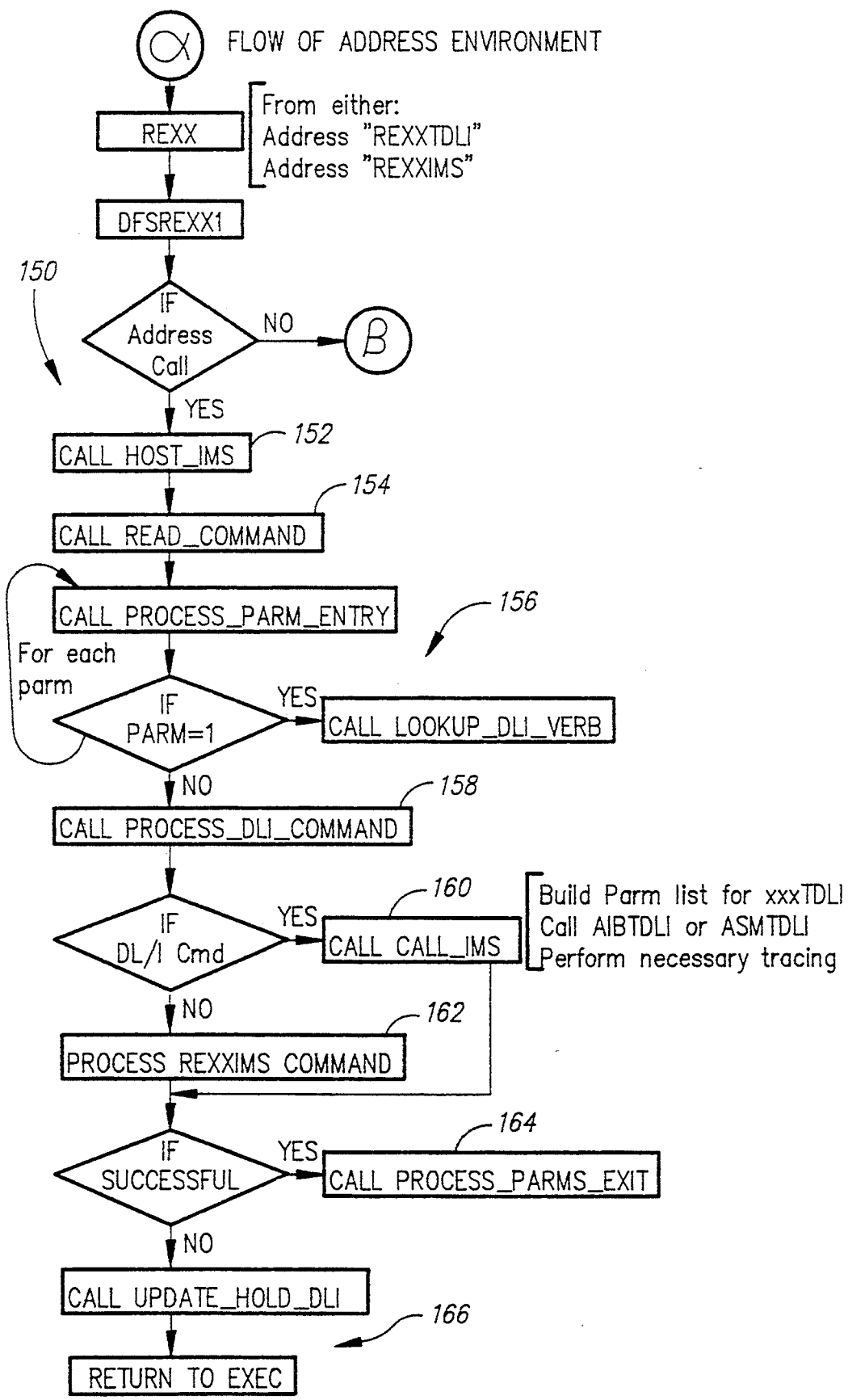
FIG. 10 is a flowchart for an address environment.
Figure 11:
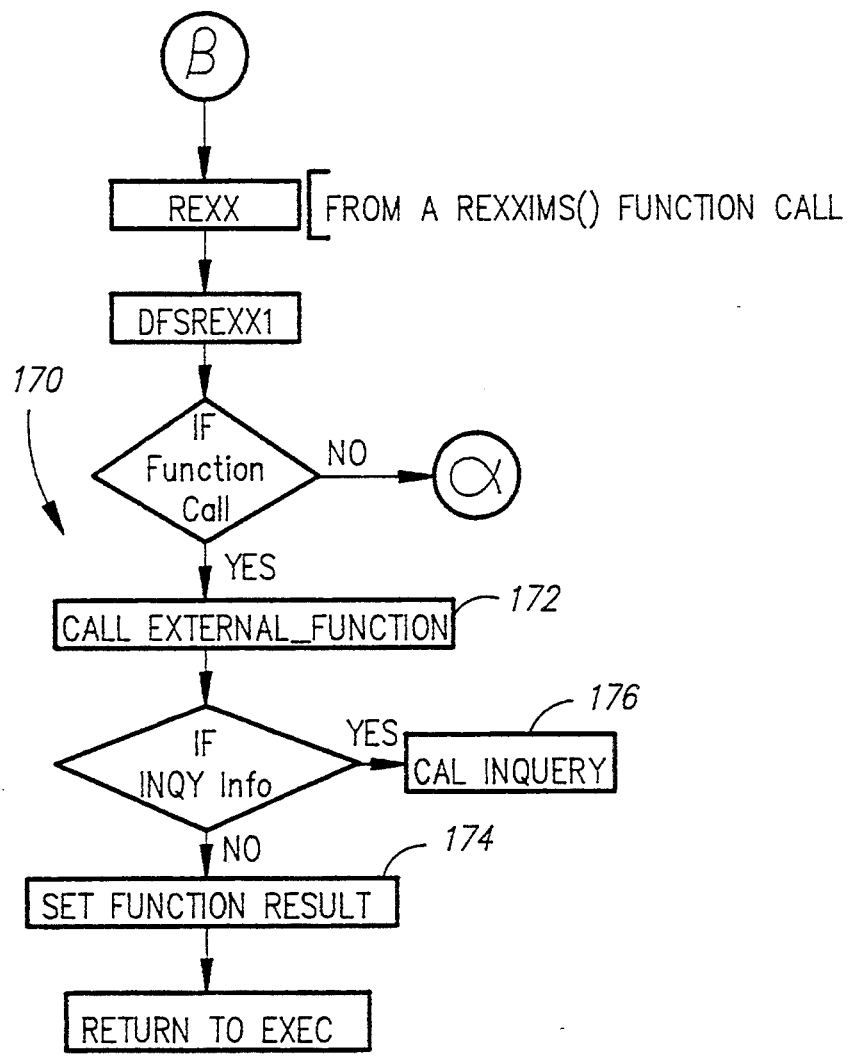
FIG. 11 is a flowchart for function calls.

A further explanation of a preferred implementation is shown with reference to FIGS. 9 through 11. The adapter system for implementing Rexx in an IMS system is called REXXTDLI. There are two modules (DFSREXX0 130 and DFSREXX1 132) that support the interfacing between IMS and the Rexx application program (the exec).

Referring to FIG. 9, the flow of the initial call to establish an adapter for processing Rexx programs in an IMS environment begins with a call to the DFSREXX0 module 130, which is a "stub" module. This module provides an interface that complies with the interface required by IMS. That is, an object module that uses general purpose register 1 (R1) to address an IMS specific parameter list. IMS only supports object modules as applications. This module serves as an initial link to the Rexx exec. This module then calls DFSREXX1 132 indicating it is an "Initial" (or schedule) call 134. The DFSREXX0 module is small so that the user can copy it to take on the desired name of the application they are writing in Rexx. The DFSREXX1 module 132 is more complex, and serves a number of purposes.

Still referring to FIG. 9, for an initial call to DFSREXX1, an initialization procedure is followed 136. If the DFSREXX1 module had been executed before in this address space, the work areas that were used are cleared 138. A user exit DFSREXXU is called 140. If the Adapter had never been called before, a procedure is followed to load all needed Rexx interpreter components (IRX routines), add REXXTDLI as an environment, add REXXIMS as an environment, and identify DFSREXX1 as REXXIMS for external functions 142. An inquiry call is made 143, and the initialization is made for running the REXX exec 144. After all of the initialization procedures are followed, the application program is run 146.

The DFSREXX1 module sets up the necessary Rexx environment when IMS calls it via DFSREXX0. The DFSREXX1 module calls the Rexx interpreter provided by TSO/E, passing the name of the user's EXEC to execute and any parameters 140. During execution of the Rexx program, DFSREXX1 provides parameter mapping between the Rexx standard parameter specification of passing variable names as parameters on the "Address REXXTDLI" commands and the IMS DL/I call parameter specification of passing pointers to the parameter data 148. The database segment mapping to Rexx variables is also provided using the segment definitions as defined by the MAPDEF, MAPGET, and MAPPUT services. There is also support for any extended commands and the external function (REXXIMS). Error handling and Tracing of DL/I calls is also handled. After the Rexx application program is finished executing (the EXEC ends) the memory work areas are cleared 144 and control is returned to IMS 146.

Referring to FIG. 10, when a non-initial call is made to DFSREXX1 from an address environment, non-external functions, which may require mapping function calls, are processed 150. The address environment processes DL/I calls, Map calls such as MAPDEF MAPGET MAPPUT (discussed previously), and some service calls. A call is made to the host IMS 152 and the function call and its operands are read 154. The parameters that accompany the command are processed for transformation to a form that can be used by IMS 156, using the mapping tables that had already been set up for these parameters.

The command is then processed using the mapped parameters 158. After the command is successfully processed, the parameters are remapped back to the form understandable by the Rexx interpreter 164 and control is returned to the Rexx Adapter 166. It is determined whether it is a DL/I command which is processed by IMS 160, otherwise it is a REXXIMS command which is processed 162.

The following commands were added to by the Adapter system which are called service requests: interfaces to MVS Operator Communications macro (WTO, WTP, WTL, and WTOR) and interfaces to IMS CPI-RR interface routines (SRRBACK and SRRCMIT). Another service is DLIINFO that queries the status and state information of the last DL/I call issued. This can commonly be used in a sophisticated general purpose application error routine to report on or possibly correct from an error condition. Another service is STORAGE which obtains and releases storage that can be used by the Rexx application, for example, directly as parameters on DL/I calls. The storage is named by a "token" name and is freed automatically at exec termination, unless an option is specified to keep for later executions.

Referring to FIG. 11, external functional processing (REXXIMS Function) through DFSREXX1 is shown 170 where the external function is called 172 and function results set 174. The external function named REXXIMS is used to query both global and DL/I specific information within the Rexx application's exec. Most information is obtained from internal state variables; however, some is queried from IMS at the time of the function's execution. In the preferred embodiment, functions to allow query of global Information within Users Rexx exec 176 are: REXXIMS('TRANCODE'), REXXIMS('USERID'), REXXIMS('IMSRXTRC'), and REXXIMS('!token'). Functions that allow access to prior DL/I call information are: REXXIMS ('FEEDBACK'), REXXIMS ('REASON'), REXXIMS ('SEGLEVEL'), REXXIMS ('SEGNAME'), REXXIMS ('STATUS'), and REXXIMS ('ZZ') .

REXXIMS('TRANCODE') retrieves IMS Transaction code currently executing. REXXIMS('USERID') retrieves the IMS Userid who originated the currently executing transaction. REXXIMS('IMSRXTRC') retrieves current Adapter tracing level as set by the "IMSRXTRC" command. REXXIMS('!token') retrieves the address and length of a storage token obtained by the "STORAGE" command. REXXIMS('FEEDBACK') retrieves information on the IMS DL/I Feedback Area. REXXIMS('REASON') retrieves the IMS Reason Code from the AIB. REXXIMS('SEGLEVEL') retrieves the IMS Database segment level from the PCB. REXXIMS('SEGNAME') retrieves the IMS Database segment name from the PCB. REXXIMS('STATUS') retrieves the IMS Status Code from the PCB. REXXIMS('ZZ') retrieves the IMS ZZ field from the I/O area.

An objective of the invention is to maximize transparency for the transaction monitor shell services in which it is acting as a pass-through for either IMS or MVS. In doing so, there is a reduction in the release-level dependency on components in Rexx or IMS. The application programming interface provided at the Rexx application program protocol boundary is in the normal Rexx format (and therefore familiar to application programmers), and the remapping to the API needed at the IMS and MVS protocol boundary is provided by the Adapter which maximizes the Rexx application programmer productivity by providing an intuitive interface.

The interface system is open-ended and allows the addition of more services without affecting the form or function of the existing services.

In general, a benefit is provided by enabling application programs for a DBMS such as IMS to be written more easily using an interpretive language such as Rexx where program development requires lesser amounts of time and resources than similar program development in other programming languages supported by the DBMS.

While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A computerized method for retrieving data from a database stored in a data storage device of a data processing system having a central processing unit (CPU), memory, an operating system and a database management system (DBMS), using an application program written in an interpretive programming language, comprising the steps of:

(a) initializing by means of the CPU implementing a set of commands, a data processing environment for processing the application program;

(b) executing the application program using a Rexx program interpreter stored in the data processing system memory; and (c) processing mapping call instructions for mapping constructs of the DBMS to constructs of the programming language, operating system call instructions, and DBMS call instructions for extracting data from the database, contained in the application program.

2. The method of claim 1 wherein initializing the data processing environment further comprises designating areas of the data processing system memory for work area storage during the processing of the application program; and initializing data processing system variables for use during the processing of the application program.

3. The method of claim 1 wherein the processing of the mapping call instructions comprises constructing a mapping data structure stored in the data processing system memory as a key to data types of a plurality of data fields of a DBMS record, specifying a name, a storage location, a length, and a data type for each of said DBMS record fields.

4. The method of claim 1 wherein the processing of the DBMS call instructions further comprises mapping parameters of the programming language to DBMS parameters using a predefined parameter type table, modifying said DBMS parameters using context-sensitive logic, running the function in the DBMS with said DBMS parameters, and mapping output from the function to the application program format using said parameter type table and context-sensitive logic.

5. The system of claim 1 wherein the DBMS system is IMS and the operating system is MVS.

6. A computerized method for interfacing between a data processing environment for executing a Rexx program with a data processing environment for an IMS database management system (DBMS), comprising the steps of:

(a) designating areas of the data processing system memory for work area storage during the processing of the Rexx program; and initializing data processing system variables used during the processing of the Rexx program;

(b) executing the Rexx program using a Rexx program interpreter;

(c) processing mapping call instructions for mapping IMS constructs to Rexx constructs, by constructing a mapping data structure stored in the data processing system memory as a key to data types of a plurality of data fields of an IMS record; and (d) processing IMS, call instructions, for extracting data from the database, by mapping Rexx parameters to IMS parameters in a DBMS parameter format using a predefined parameter type table, modifying said IMS parameters using context-sensitive logic, running a function in IMS with said IMS parameters, and mapping output from said function to the Rexx format using said parameter type table and said context-sensitive logic.

7. The computerized method of claim 6, further comprising the step of specifying at least one of a name, a storage location, a length, or a data type for each of said IMS record fields.

8. The computerized method of claim 6, further comprising the step of processing operating system calls.

9. A computerized system for retrieving data from a database stored in a data storage device of a data processing system having a central processing unit (CPU), memory, an operating system and a database management system (DBMS), using an application program written in an interpretive programming language, comprising:

means for initializing a data processing environment for processing the application program;

means for executing the application program using a Rexx program interpreter;

means for processing mapping call instructions for mapping constructs of the DBMS to constructs of the programming language;

means for processing operating system call instructions; and means for processing DBMS call instructions for extracting data from the database.

* * * * *